United States Patent
Yen et al.

(10) Patent No.: US 12,434,458 B2
(45) Date of Patent: Oct. 7, 2025

(54) POLYPROPYLENE-BASED OUTSOLE MATERIAL, FOOTWEAR SOLE STRUCTURE INCLUDING THE SAME, AND FOOTWEAR ARTICLE INCLUDING THE FOOTWEAR SOLE STRUCTURE

(71) Applicants: Hung-Chia Yen, Taichung (TW); Pei-Neng Hsu, Changhua County (TW); GUANG XIN POLYMER COMPOSITES CO., LTD., Nantou County (TW)

(72) Inventors: Hung-Chia Yen, Taichung (TW); Pei-Neng Hsu, Changhua (TW)

(73) Assignees: GUANG XIN POLYMER COMPOSITES CO., LTD., Nantou County (TW); Hung-Chia Yen, Taichung (TW); Pei-Neng Hsu, Changhua County (TW)

( * ) Notice: Subject to any disclaimer, the term of this patent is extended or adjusted under 35 U.S.C. 154(b) by 175 days.

(21) Appl. No.: 18/394,456

(22) Filed: Dec. 22, 2023

(65) Prior Publication Data
US 2025/0074036 A1    Mar. 6, 2025

(30) Foreign Application Priority Data
Aug. 31, 2023   (TW) ................. 112133144

(51) Int. Cl.
| | | |
|---|---|---|
| B32B 27/00 | (2006.01) | |
| A43B 13/12 | (2006.01) | |
| B32B 27/32 | (2006.01) | |
| C08L 23/12 | (2006.01) | |

(52) U.S. Cl.
CPC ............ *B32B 27/00* (2013.01); *A43B 13/122* (2013.01); *B32B 27/32* (2013.01); *C08L 23/12* (2013.01)

(58) Field of Classification Search
None
See application file for complete search history.

(56) References Cited

U.S. PATENT DOCUMENTS

2015/0353718 A1* 12/2015 Weaver ............... C08K 5/0016
                                                             524/232

FOREIGN PATENT DOCUMENTS

| CN | 105419112 A | * | 3/2016 | ............. C08L 23/14 |
| JP | 04261449 A | * | 9/1992 | |

OTHER PUBLICATIONS

Machine translation of CN 105419112 A (Year: 2023).*
Machine translation of JP H04-261449 A (Year: 1992).*

* cited by examiner

*Primary Examiner* — Ramsey Zacharia
(74) *Attorney, Agent, or Firm* — Fish & Richardson P.C.

(57) ABSTRACT

A polypropylene-based outsole material, which includes, based on 100 wt % of the polypropylene-based outsole material, a polypropylene homopolymer present in an amount ranging from 5 wt % to 25 wt %, a thermoplastic polypropylene copolymer present in an amount ranging from 70 wt % to 87 wt %, and a modifier present in an amount greater than 0 wt % and not greater than 10 wt %. The modifier is a maleic anhydride-grafted polyolefin elastomer. A footwear sole structure including an outsole made of the polypropylene-based outsole material, and a footwear article including the footwear sole structure are also provided.

7 Claims, No Drawings

POLYPROPYLENE-BASED OUTSOLE MATERIAL, FOOTWEAR SOLE STRUCTURE INCLUDING THE SAME, AND FOOTWEAR ARTICLE INCLUDING THE FOOTWEAR SOLE STRUCTURE

CROSS-REFERENCE TO RELATED APPLICATION

This application claims priority to Taiwanese Invention patent application No. 112133144, filed on Aug. 31, 2023, which is incorporated by reference herein in its entirety.

FIELD

The disclosure relates to a polypropylene-based outsole material and a footwear sole structure including the same. The disclosure also relates to a footwear article including the footwear sole structure.

BACKGROUND

Materials currently used to make shoe outsoles may include, for example, rubber, polyurethane (PU), and ethylene-vinyl acetate (EVA) copolymer, but in the field of shoe manufacturing, polypropylene is rarely used for making an outsole of a footwear article because a shoe outsole made of polypropylene tends to have drawbacks such as high hardness and poor slip resistance. In addition, the non-polar nature of polypropylene makes such polypropylene-made shoe outsole difficult to be adhered to other footwear components, and hence, in order to successfully complete an adhesion process, an adhesive is often required. However, the utilization of such adhesive may impede recycling of a footwear with the polypropylene-made shoe outsole after its abandonment.

Based on the aforesaid description, those skilled in the art strive to develop a polypropylene-based outsole material that allows an outsole made of it to be directly bonded to a midsole without using any adhesives, so that such outsole may be recycled with fewer issues after being discarded, thereby achieving the purpose of being environmental friendly.

SUMMARY

Accordingly, in a first aspect, the present disclosure provides a polypropylene-based outsole material, which can alleviate at least one of the drawbacks of the prior art. The polypropylene-based outsole material includes, based on 100 wt % of the polypropylene-based outsole material:
a polypropylene homopolymer present in an amount ranging from 5 wt % to 25 wt %;
a thermoplastic polypropylene copolymer present in an amount ranging from 70 wt % to 87 wt %; and
a modifier present in an amount greater than 0 wt % and not greater than 10 wt %, the modifier being a maleic anhydride-grafted polyolefin elastomer.

In a second aspect, the present disclosure provides a footwear sole structure, which can alleviate at least one of the drawbacks of the prior art. The footwear sole structure includes:
an outsole made of the aforesaid polypropylene-based outsole material; and
a midsole made of a midsole material including a polyolefin elastomer, the midsole being bonded onto a surface of the outsole by subjecting the midsole material to a foaming process, followed by solidification.

In a third aspect, the present disclosure provides a method for manufacturing the aforesaid footwear sole structure, which can alleviate at least one of the drawbacks of the prior art. The method includes:
(a) forming an outsole from the aforesaid polypropylene-based outsole material by an injection molding process;
(b) disposing the outsole obtained in step (a) into a midsole mold, followed by injecting a midsole material including a polyolefin elastomer into the midsole mold so that the midsole material covers a surface of the outsole; and
(c) subjecting the midsole material covering the surface of the outsole in step (b) to a foaming process, followed by solidification, thereby obtaining a midsole that is bonded onto the surface of the outsole to form the footwear sole structure.

In a fourth aspect, the present disclosure provides a footwear article, which can alleviate at least one of the drawbacks of the prior art. The footwear article includes the aforesaid footwear sole structure.

DETAILED DESCRIPTION

It is to be understood that, if any prior art publication is referred to herein, such reference does not constitute an admission that the publication forms a part of the common general knowledge in the art, in Taiwan or any other country.

For the purpose of this specification, it will be clearly understood that the word "comprising" means "including but not limited to", and that the word "comprises" has a corresponding meaning.

Unless otherwise defined, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

The present disclosure provides a polypropylene-based outsole material that includes, based on 100 wt % of the polypropylene-based outsole material:
a polypropylene homopolymer present in an amount ranging from 5 wt % to 25 wt %;
a thermoplastic polypropylene copolymer present in an amount ranging from 70 wt % to 87 wt %; and
a modifier present in an amount greater than 0 wt % and not greater than 10 wt %, the modifier being a maleic anhydride-grafted polyolefin elastomer.

The polypropylene homopolymer is provided to render a basic hardness to an outsole made of the polypropylene-based outsole material. By controlling the amount of the polypropylene homopolymer to be not smaller than 5 wt % based on 100 wt % of the polypropylene-based outsole material, the polypropylene homopolymer at such amount may work cooperatively with the thermoplastic polypropylene copolymer to provide the outsole with a good wear resistance. In addition, by further controlling the amount of the polypropylene homopolymer to be not greater than 25 wt % based on 100 wt % of the polypropylene-based outsole material, the polypropylene homopolymer at such amount may work cooperatively with the thermoplastic polypropylene copolymer to provide the outsole with an appropriate hardness, i.e., a Shore A hardness of not lower than 65 and lower than 75, and also with a high anti-slip coefficient so as to obtain an enhanced anti-slip property. In certain embodiments, in order to allow the outsole to attain a higher tensile strength and thus to have a better mechanical property, the amount of the polypropylene homopolymer may range from 10 wt % to 25 wt % based on 100 wt % of the polypropylene-based outsole material.

In some embodiments, the polypropylene homopolymer may have a melt flow rate (at 230° C./2.16 kg) within a range from 6 g/10 min to 15 g/10 min, as determined using the standard method of ASTM D1238. In some embodiments, the polypropylene homopolymer may have a tensile modulus of 22 MPa, as determined using the standard method of ASTM D638. In some embodiments, the polypropylene homopolymer may have a tensile strength greater than 19.0 MPa, as determined using the standard method of ASTM D638. In some embodiments, the polypropylene homopolymer may have an elongation at break greater than 1000%, as determined using the standard method of ASTM D638. In some embodiments, the polypropylene homopolymer may have a brittleness temperature lower than −28° C., as determined using the standard method of ASTM D746. In an exemplary embodiment, the polypropylene homopolymer has a melting temperature of 160° C.

The thermoplastic polypropylene copolymer is mainly used to work together with the polypropylene homopolymer so as to cooperatively adjust a hardness of the outsole, thereby providing the outsole with a desired hardness. Moreover, by controlling the amount of the thermoplastic polypropylene copolymer to fall within a range from 70 wt % to 87 wt % based on 100 wt % of the polypropylene-based outsole material, the thermoplastic polypropylene copolymer may collaborate with the polypropylene homopolymer to provide the outsole with a Shore A hardness of not lower than 65 and lower than 75, which is deemed as a suitable hardness, and also to provide the outsole with a high anti-slip coefficient so that the outsole may exhibit a good anti-slip property. In some embodiments, in order to render a higher tensile strength to the outsole so that the outsole may have a better mechanical property, the amount of the thermoplastic polypropylene copolymer may range from 70 wt % to 85 wt % based on 100 wt % of the polypropylene-based outsole material.

It should be noted that, in the disclosure, the polypropylene homopolymer refers to a homopolymer formed by subjecting propylene monomers to a polymerization reaction, and the thermoplastic polypropylene copolymer refers to a copolymer formed by subjecting propylene monomers and other non-propylene monomers to a polymerization reaction. In other embodiments, in order to provide the outsole with an improved wear resistance, the thermoplastic polypropylene copolymer may not include an ethylene/propylene copolymer. Specifically, for achieving such improved wear resistance, the thermoplastic polypropylene copolymer does not include an ethylene/propylene copolymer rubber that is formed by subjecting ethylene monomers and propylene monomers to a polymerization reaction.

In certain embodiments, for the purpose of preventing the outsole from being misshaped due to excessive heat energy generated by friction between the outsole and a ground surface, the thermoplastic polypropylene copolymer may have a melting point ranging from 120° C. to 160° C. as determined by differential scanning calorimetry. In some embodiments, the thermoplastic polypropylene copolymer may have a low hardness and a high elasticity, and in order to further optimize the cooperative work between the thermoplastic polypropylene copolymer and the polypropylene homopolymer so as to provide the outsole with a Shore A hardness of not lower than 65 and lower than 75, the thermoplastic polypropylene copolymer may have a Shore A hardness ranging from 60 to 80, and a resilience by vertical rebound ranging from 50% to 60% as determined by ASTM D2632, which is a test method for measuring rubber resilience property. To be more specific, the resilience refers to a ratio of a rebound height of an impact pendulum to a drop height thereof, measured by subjecting a test sample, i.e., the thermoplastic polypropylene copolymer herein, to the test method using a vertical rebound resilience tester, where the impact pendulum falls freely upon the test sample. In certain embodiments, the thermoplastic polypropylene copolymer with the low hardness and the high elasticity may have a Shore A hardness ranging from 60 to 80, a resilience by vertical rebound ranging from 50% to 60% as determined by ASTM D2632, and a melting point ranging from 120° C. to 160° C. as determined by differential scanning calorimetry.

The modifier mainly functions to allow a midsole to be directly bonded onto a surface of the outsole without utilizing an adhesive, while remaining a good bonding strength between the midsole and the outsole. The midsole may be made of a midsole material including a polyolefin elastomer, and may be made by injecting the midsole component and then subjecting the midsole component to a foaming process, but methods for producing the midsole are not limited thereto. By controlling the amount of modifier to be greater than 0 wt % based on 100 wt % of the polypropylene-based outsole material, the outsole thus made has a high anti-slip coefficient so as to obtain a good anti-slip property as well as to improve the bonding strength between the outsole and the midsole. Moreover, by controlling the amount of the modifier to be greater than 0 wt % and not greater than 10 wt % based on 100 wt % of the polypropylene-based outsole material, a reasonable production cost for making the outsole and a satisfying wear resistance thereof may further be achieved. In certain embodiments, the maleic anhydride-grafted polyolefin elastomer is a maleic anhydride-grafted ethylene/octene copolymer.

In certain embodiments, for rendering an even better wear resistance to the outsole, the polypropylene-based outsole material may further include a silicone rubber present in an amount greater than 0 wt % and smaller than 10 wt % based on 100 wt % of the polypropylene-based outsole material. By controlling the amount of the silicone rubber to be greater than 0 wt % based on 100 wt % of the polypropylene-based outsole material, the outsole obtains a lower wear resistance coefficient as measured using DIN abrasion testing, and thus exhibits a high wear resistance property. Furthermore, by controlling the amount of the silicone rubber to be greater than 0 wt % and smaller than 10 wt % based on 100 wt % of the polypropylene-based outsole material, the silicone rubber may work cooperatively with the polypropylene homopolymer, the thermoplastic polypropylene copolymer, and the modifier to provide the outsole with a high anti-slip coefficient, thereby enhancing the outsole's anti-slip capability. In some embodiments, the silicone rubber may withstand a temperature greater than 100° C., such as 120° C. or 150° C., but the temperature is not limited thereto. In an exemplary embodiment, the silicone rubber is manufactured by Shin-Etsu Chemical Co., Ltd., and is suitable for high-temperature vulcanization techniques.

In addition, the present disclosure provides a footwear sole structure, which includes an outsole that is made of the aforesaid polypropylene-based outsole material, and a midsole that is made of a midsole material including a polyolefin elastomer. The midsole is bonded onto a surface of the outsole by subjecting the midsole material to a foaming process, followed by solidification. In some embodiments, the outsole is obtained by subjecting the polypropylene-based outsole material to an injection molding process. It should be noted that since there is no adhesive used between the outsole and midsole, the footwear sole structure thus made has an advantage of being easier to recycle.

The present disclosure also provides a method for manufacturing a footwear sole structure, which includes the following steps (a) to (c).

Step (a) involves forming an outsole from the abovementioned polypropylene-based outsole material by an injection molding process.

Step (b) involves disposing the outsole obtained in step (a) into a midsole mold, followed by injecting a midsole material including a polyolefin elastomer into the midsole mold so that the midsole material covers a surface of the outsole.

Step (c) involves subjecting the midsole material covering the surface of the outsole in step (b) to a foaming process, followed by solidification, thereby obtaining a midsole that is bonded onto the surface of the outsole to form the footwear sole structure.

In certain embodiments, the foaming process may be a supercritical foaming process. In certain embodiments, in step (b), the midsole material may be subjected to a cross-linking reaction prior to being injected into the midsole mold, so as to form a cross-linked midsole material. The cross-linking reaction may be a physical cross-linking reaction or a chemical cross-linking reaction. In certain embodiments, in step (b), the midsole material may be subjected to the cross-linking reaction so as to form into the cross-linked midsole material, and then the cross-linked midsole material is injected into the midsole mold and then subjected to the supercritical foaming process, followed by solidification, so that the midsole is formed and may be directly bonded onto the surface of the outsole without utilizing an adhesive due to having the modifier in the outsole. In addition, the outsole and the midsole in the footwear sole structure thus obtained has a good bonding strength therebetween. It should be noted that techniques regarding the cross-linking reaction and the supercritical foaming process are well known to those skilled in the art, so there is no need to elaborate on such techniques herein.

Furthermore, the present disclosure provides a footwear article which includes the aforesaid footwear sole structure.

The disclosure will be further described by way of the following examples. However, it should be understood that the following examples are intended solely for the purpose of illustration and should not be construed as limiting the present disclosure in practice.

EXAMPLES

Preparation of Polypropylene-Based Outsole Material and Footwear Sole Structure

Example 1

First, 15 wt % of a polypropylene homopolymer (Globalene® 6331; melt flow rate: 15 g/10 min (230° C./2.16 kg)), 80 wt % of a thermoplastic polypropylene copolymer with low hardness and high elasticity (melting point: 160° C. as determined by differential scanning calorimetry; Shore A hardness: 70; resilience by vertical rebound: 55% as determined by ASTM D2632), and 5 wt % of a modifier (a maleic anhydride-grafted ethylene/octene copolymer; Fusabond® 493D) were introduced into a Banbury® mixer (Song Ming Machinery Ind. Co., Ltd.) for mixing, so as to obtained a polypropylene-based outsole material. Afterward, when the polypropylene-based outsole material itself reached a temperature of 175° C., it was introduced from the Banbury® mixer into a single-screw extruder (Song Ming Machinery Ind. Co., Ltd.), followed by granulation, thereby obtaining polypropylene-based outsole material particles. Thereafter, the polypropylene-based outsole material particles were injected into an outsole mold, so as to form an outsole.

Next, the outsole was disposed into a midsole mold. Thereafter, a midsole material containing 29 wt % of a polyolefin elastomer, 50 wt % of an ethylene/vinyl acetate copolymer, 20 wt % of a polyethylene, and 1 wt % of titanium dioxide was introduced into a twin-screw extruder (Sino-Alloy Machinery Inc.), followed by granulation, thereby obtaining midsole material particles. Subsequently, the midsole material particles were subjected to a cross-linking reaction, so as to form cross-linked midsole material particles. Afterward, the cross-linked midsole material particles were introduced into a supercritical injection molding apparatus (Tien Kang Co, Ltd.), and then being impregnated and mixed with a supercritical gas (nitrogen gas in an amount of 0.4 wt %), followed by being injected into the midsole mold to cover a surface of the outsole. Thereafter, the cross-linked midsole material particles covering the surface of the outsole were subjected to a supercritical foaming process, followed by solidification, so as to form a midsole that was directly bonded onto the surface of the outsole, thereby obtaining a footwear sole structure including the outsole and the midsole.

Example 2

First, 15 wt % of a polypropylene homopolymer (Globalene® 6331; melt flow rate: 15 g/10 min (230° C./2.16 kg)), 77 wt % of a thermoplastic polypropylene copolymer with low hardness and high elasticity (melting point: 160° C. as determined by differential scanning calorimetry; Shore A hardness: 70; resilience by vertical rebound: 55% as determined by ASTM D2632), 5 wt % of a modifier (a maleic anhydride-grafted ethylene/octene copolymer; Fusabond® 493D), and 3 wt % of a silicone rubber (Shin-Etsu KE-931U) were introduced into a Banbury® mixer (Song Ming Machinery Ind. Co., Ltd.) for mixing, so as to obtained a polypropylene-based outsole material. Afterward, when the polypropylene-based outsole material itself reached a temperature of 175° C., it was introduced from the Banbury® mixer into a single-screw extruder (Song Ming Machinery Ind. Co., Ltd.), followed by granulation, thereby obtaining polypropylene-based outsole material particles. Thereafter, the polypropylene-based outsole material particles were injected into an outsole mold, so as to form an outsole.

Subsequently, the outsole was disposed into a midsole mold, followed by manufacturing a midsole on a surface of the outsole using the method as described in Example 1, thereby obtaining a footwear sole structure.

Examples 3 to 5

The polypropylene-based outsole materials and the footwear sole structures of Examples 3 to 5 were prepared using procedures similar to those of Example 2, except that the amount of each of the polypropylene homopolymer, the thermoplastic polypropylene copolymer, and the modifier was varied as shown in Table 1 below.

Comparative Examples 1 to 5

The polypropylene-based outsole materials and the footwear sole structures of Comparative Examples 1 to 5 were prepared using procedures similar to those of Example 1 or 2, except that the amount of each of the polypropylene homopolymer, the thermoplastic polypropylene copolymer, the modifier, and the silicone rubber was varied as shown in Table 2 below.

Property Evaluation

A. Measurement of Hardness

The outsole of Example 1 was subjected to determination of hardness using ASTM-D2240 Standard Test Method for Rubber Property-Durometer Hardness with a Shore hardness tester (TECLOCK; Model: GS-709N), so as to obtain a Shore A hardness thereof. The result showed that the Shore A hardness of the outsole of Example 1 (i.e., ranging from 71 to 72) was not lower than 65 and lower than 75, indicating that the outsole of Example 1 had an acceptable hardness.

The outsole of each of Examples 2 to 5 and Comparative Examples 1 to 5 was also subjected to the same measurement, and the results were shown in Tables 1 and 2 below.

B. Measurement of Tensile Strength

The outsole of Example 1 was subjected to determination of tensile strength using ASTM D638 Standard Test Method for Tensile Properties of Plastics with an universal testing machine (GOTECH; Model: Al-7000M), so as to obtain a tensile strength thereof. The result showed that the tensile strength of the outsole of Example 1 (i.e., 92 kg/cm$^2$) was greater than 70 kg/cm$^2$, indicating that the outsole of Example 1 had an enhanced mechanical property.

The outsole of each of Examples 2 to 5 and Comparative Examples 1 to 5 was also subjected to the same measurement, and the results were shown in Tables 1 and 2 below.

C. Determination of Elongation Percentage

The outsole of Example 1 was subjected to determination of elongation percentage using ASTM D638 Standard Test Method for Tensile Properties of Plastics with a universal testing machine (GOTECH; Model: Al-7000M), so as to obtain an elongation percentage thereof. The result showed that the elongation percentage of the outsole of Example 1 (i.e., 623%) was greater than 400%, indicating that the outsole of Example 1 had an enhanced mechanical property.

The outsole of each of Examples 2 to 5 and Comparative Examples 1 to 5 was also subjected to the same measurement, and the results were shown in Tables 1 and 2 below.

D. Determination of Abrasion Resistance

The outsole of Example 1 was subjected to determination of abrasion resistance using DIN 53516 Standard Test Method with an abrasion testing machine (GOTECH; Model: GT 7012-D), so as to obtain an abrasion resistance coefficient thereof. The results showed that the outsole of Example 1 had a lower abrasion resistance coefficient (i.e., 286), indicating that the outsole of Example 1 had a good abrasion resistance.

The outsole of each of Examples 2 to 5 and Comparative Examples 1 to 5 was also subjected to the same determination, and the results were shown in Tables 1 and 2 below.

E. Measurement of Slip Resistance

The outsole of Example 1 was subjected to determination of slip resistance using SATRA TM144 Standard Test Method with an abrasion testing machine (GOTECH; Model: GT 7012-D), so as to obtain a dry static coefficient of friction and a wet static coefficient of friction thereof. The result showed that the outsole of Example 1 had a dry static coefficient of friction (i.e., 1.01) of greater than 1 and a wet static coefficient of friction (i.e., 0.55) of greater than 0.5, indicating that the outsole of Example 1 had advantageous slip-resistance.

The outsole of each of Examples 2 to 5 and Comparative Examples 1 to 5 was also subjected to the same measurement, and the results were shown in Tables 1 and 2 below.

F. Measurement of Bonding Strength

The footwear sole structure of Example 1 was subjected to determination of peel strength using SATRA TM65 Standard Test Method with a universal testing machine (GOTECH; Model: Al-7000M), so as to obtain a peel strength between the outsole and the midsole of the footwear sole structure. Such peel strength was deemed as a bonding strength between the outsole and the midsole of the footwear sole structure herein. The results showed that the peel strength between the outsole and the midsole of Example 1 (i.e., 2.35 kg/cm) was greater than 2 kg/cm, indicating that the outsole and the midsole of the footwear sole structure of Example 1 had an advantageous bonding strength therebetween.

The footwear sole structure of each of Examples 2 to 5 and Comparative Examples 1 to 5 was also subjected to the same measurement, and the results were shown in Tables 1 and 2 below.

TABLE 1

|  |  | Example | | | | |
| --- | --- | --- | --- | --- | --- | --- |
|  |  | 1 | 2 | 3 | 4 | 5 |
| Polypropylene-based outsole material | Polypropylene homopolymer (wt %) | 15 | 15 | 15 | 7 | 5 |
|  | Thermoplastic polypropylene copolymer (wt %) | 80 | 77 | 72 | 85 | 87 |
|  | Modifier (wt %) | 5 | 5 | 10 | 5 | 5 |
|  | Silicone rubber (wt %) | 0 | 3 | 3 | 3 | 3 |
|  | Total amount (wt %) | 100 | 100 | 100 | 100 | 100 |
| Physical properties | Shore A hardness | 71-72 | 70-71 | 68-70 | 68-70 | 67-69 |
|  | Tensile strength (kg/cm$^2$) | 92 | 95 | 72 | 68 | 63 |
|  | Percentage of elongation (%) | 623 | 641 | 568 | 675 | 632 |

TABLE 1-continued

|  |  | Example | | | | |
|---|---|---|---|---|---|---|
|  |  | 1 | 2 | 3 | 4 | 5 |
|  | Abrasion resistance coefficient (mm$^3$) | 286 | 73 | 108 | 112 | 125 |
|  | Dry anti-slip coefficient | 1.01 | 1.02 | 1.06 | 1.06 | 1.1 |
|  | Wet anti-slip coefficient | 0.55 | 0.5 | 0.53 | 0.53 | 0.54 |
|  | Bonding strength | 2.35 | 2.12 | 2.5 | 2.16 | 2.3 |

TABLE 2

|  |  | Comparative Example | | | | |
|---|---|---|---|---|---|---|
|  |  | 1 | 2 | 3 | 4 | 5 |
| Polypropylene-based outsole material | Polypropylene homopolymer (wt %) | 20 | 15 | 50 | 32 | 10 |
|  | Thermoplastic polypropylene copolymer (wt %) | 80 | 85 | 42 | 60 | 80 |
|  | Modifier (wt %) | 0 | 0 | 5 | 5 | 5 |
|  | Silicone rubber (wt %) | 0 | 0 | 3 | 3 | 10 |
|  | Total amount (wt %) | 100 | 100 | 100 | 100 | 100 |
| Physical properties | Shore A hardness | 80-81 | 72-73 | >100 | >100 | 68-69 |
|  | Tensile strength (kg/cm$^2$) | 102 | 88 | 157 | 123 | 56 |
|  | Percentage of elongation (%) | 557 | 602 | 154 | 352 | 450 |
|  | Abrasion resistance coefficient (mm$^3$) | 235 | 302 | 42 | 57 | 57 |
|  | Dry anti-slip coefficient | 0.9 | 0.96 | 0.68 | 0.71 | 0.86 |
|  | Wet anti-slip coefficient | 0.4 | 0.52 | 0.25 | 0.31 | 0.42 |
|  | Bonding strength | 0.22 | 0.31 | 0.09 | 0.12 | 0.36 |

Referring to Tables 1 and 2, in the propylene-based outsole material, by virtue of cooperation of the polypropylene homopolymer, the thermoplastic polypropylene copolymer, and the modifier, and particularly by virtue of modifying their amounts, the outsole in each of Examples 1 to 5 has both satisfactory hardness and slip resistance. In addition, the bonding strength between the outsole and midsole in each of the footwear sole structures of Examples 1 to 5 is also acceptable, and the outsole thereof shows high elongation percentage so a good mechanical property is obtained.

Moreover, in the polypropylene-based outsole material of each of Examples 1 to 3, the amount of the polypropylene homopolymer is controlled within the range from 10 wt % to 25%, and the amount of the thermoplastic polypropylene copolymer is controlled within the range from 70 wt % to 85 wt %, based on 100 wt % of the polypropylene-based outsole material, such that the outsole thereof possesses a higher tensile strength, thereby obtaining an enhanced mechanical property. Furthermore, by adding the silicone rubber into the polypropylene-based outsole material of each of Examples 2 to 5, and by controlling the amount of the silicone rubber to be greater than 0 wt % and smaller than 10 wt % based on 100 wt % of the polypropylene-based outsole material, the outsole thereof obtains a lower abrasion resistance coefficient, thereby achieving a better abrasion resistance.

In contrast, the outsole of each of Comparative Examples 1 and 2 does not have acceptable hardness and slip resistance due to not having the modifier in the polypropylene-based outsole material. In addition, in the polypropylene-based outsole material of each of Comparative Examples 3 and 4, the amount of the polypropylene homopolymer is not controlled to be within the range from 5 wt % to 25 wt %, and the amount of the thermoplastic polypropylene copolymer is not controlled to be within the range from 70 wt % to 87 wt %, so the outsole thereof does not exhibit satisfactory hardness and slip resistance. Moreover, in the polypropylene-based outsole material of Comparative Example 5, the amount of the silicone rubber is not controlled to be greater than 0 wt % and smaller than 10 wt %, and therefore the outsole thereof shows poor slip resistance.

In sum, in the polypropylene-based outsole material according to the disclosure, by virtue of collaborative work of the polypropylene homopolymer, the thermoplastic polypropylene copolymer, and the modifier, in particular by arranging the amount of the foregoing three ones, the outsole thus manufactured has appropriate hardness and good slip resistance. In addition, because of the utilization of the modifier in the polypropylene-based outsole material, the outsole made thereof allows the midsole to be directly bonded onto the surface of the outsole without using any adhesive, after injection, foaming, and solidification of the midsole material, and an excellent bonding strength therebetween is attained. Accordingly, the footwear sole structure according to the disclosure has an advantage of being easy to recycle and be reused. Furthermore, by adding the silicone rubber and managing it to be present in the amount greater than 0 wt % and smaller than 10 wt % based on 100 wt % of the polypropylene-based outsole material, the outsole made thereof has a better abrasion resistance.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, FIGURE, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A polypropylene-based outsole material comprising, based on 100 wt % of the polypropylene-based outsole material:
   a polypropylene homopolymer present in an amount ranging from 5 wt % to 25 wt %;
   a thermoplastic polypropylene copolymer present in an amount ranging from 70 wt % to 87 wt %; and
   a modifier present in an amount greater than 0 wt % and not greater than 10 wt %, the modifier being a maleic anhydride-grafted polyolefin elastomer.

2. The polypropylene-based outsole material as claimed in claim 1, wherein the thermoplastic polypropylene copolymer has a melting point ranging from 120° C. to 160° C. as determined by differential scanning calorimetry.

3. The polypropylene-based outsole material as claimed in claim 1, wherein the thermoplastic polypropylene copolymer has a Shore A hardness ranging from 60 to 80.

4. The polypropylene-based outsole material as claimed in claim 1, wherein the maleic anhydride-grafted polyolefin elastomer is a maleic anhydride-grafted ethylene/octene copolymer.

5. The polypropylene-based outsole material as claimed in claim 1, further comprising a silicone rubber present in an amount greater than 0 wt % and smaller than 10 wt % based on 100 wt % of the polypropylene-based outsole material.

6. A footwear sole structure, comprising:
   an outsole made of a polypropylene-based outsole material as claimed in claim 1; and
   a midsole made of a midsole material including a polyolefin elastomer, the midsole being bonded onto a surface of the outsole by subjecting the midsole material to a foaming process, followed by solidification.

7. A footwear article, comprising a footwear sole structure as claimed in claim 6.

* * * * *